Feb. 20, 1945.  H. P. ALLEN  2,369,932

PRESSURE COOKER

Filed July 21, 1943  2 Sheets-Sheet 1

WITNESSES:
Louis Necho
E. H. Lutz

INVENTOR
HAROLD P. ALLEN.
BY
ATTORNEY

Feb. 20, 1945.  H. P. ALLEN  2,369,932
PRESSURE COOKER
Filed July 21, 1943  2 Sheets-Sheet 2

WITNESSES:
Louis Necho
E. H. Lutz

INVENTOR
HAROLD P. ALLEN
BY
ATTORNEY

Patented Feb. 20, 1945

2,369,932

UNITED STATES PATENT OFFICE 2,369,932

PRESSURE COOKER

Harold P. Allen, Mansfield, Ohio, assignor to Westinghouse Electric & Manufacturing Company, East Pittsburgh, Pa., a corporation of Pennsylvania Application July 21, 1943, Serial No. 495,609

7 Claims. (Cl. 219—43)

My invention relates to a pressure cooker and has for an object to produce improved apparatus of this type.

A further object of my invention is to produce an improved control for a pressure cooker of the type set forth.

A still further object of my invention is to produce a conveniently-operated pressure cooker.

These and other objects are effected by my invention as will be apparent from the following description and claims taken in connection with the accompanying drawings, forming a part of this application, in which:

Figure 1:
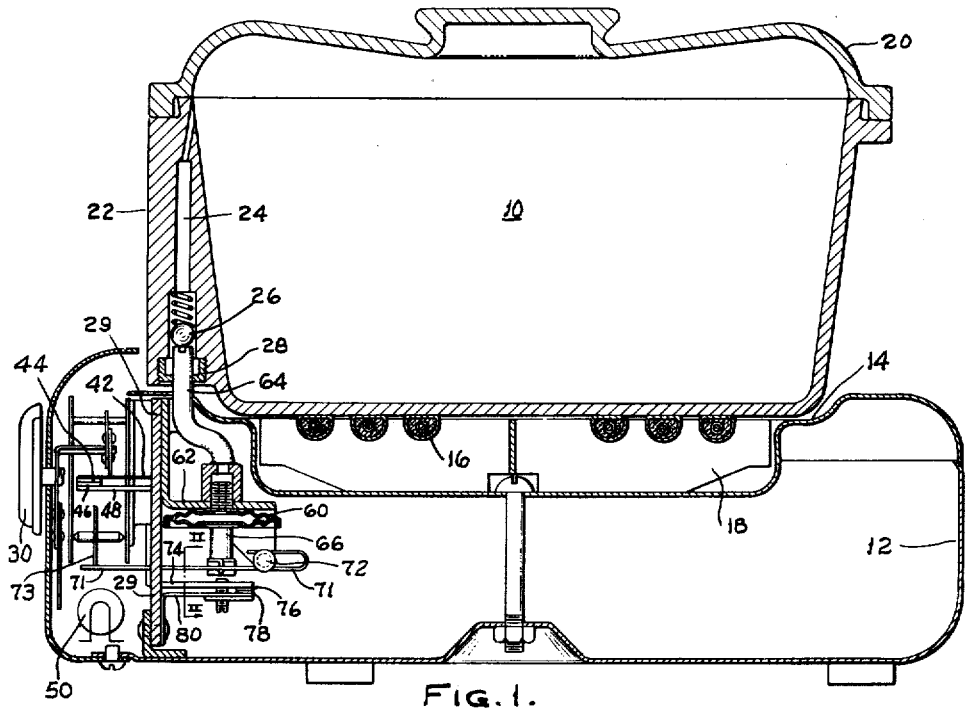
Fig. 1 is a vertical cross sectional view of a pressure cooker provided with a control mechanism embodying my invention.

Referring to the drawings and more particularly to Fig. 1, I show a pressure cooker including a vessel 10 and a supporting stand 12. The stand 12 is provided with a recess 14 for accommodating the bottom of the pan. The vessel 10 rests on a heating element 16 carried by a spider or the like 18 and is provided with a tight cover 20 which may be suitably clamped to the rim thereof. The vertical wall of the pot 10 is preferably provided with an enlarged portion 22 through which extends, or is formed, a conduit or passage 24. The upper end of the conduit 24 communicates with the interior of the pot 10 while the lower end thereof is normally closed by means of a spring-pressed ball valve 26 adapted to seat against and close an opening in a guide member 28, threaded at the lower end of the enlarged portion 22.

The stand 12 carries a control mechanism which includes a timing device adapted to be set to measure a predetermined period of cooking at a predetermined pressure, means for engaging and preventing said timing device from effecting such measurement until such pressure has been reached, pressure-responsive means for releasing the timing device, when said pressure is reached, to permit the same to begin to measure the period of time for which it was set, means for maintaining the pressure within said vessel constant, and a signal lamp for indicating the beginning and the end of a cooking operation.

Figure 4:
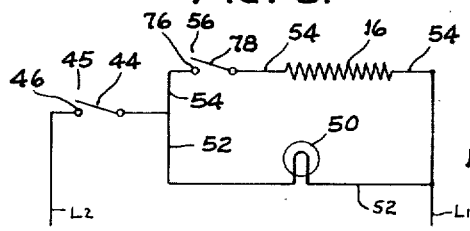
Fig. 4 is a diagrammatic view of an electric circuit forming part of the control mechanism.

The heating element and the signal lamp are connected in parallel to an electric circuit which is best shown in Fig. 4. This circuit includes a main switch which energizes and deenergizes both the heating element and the signal lamp at the start and the end of a cooking operation, and an auxiliary cycling switch for energizing or deenergizing the heating element only, according to the pressure prevailing within the vessel.

Figures 2, 3:
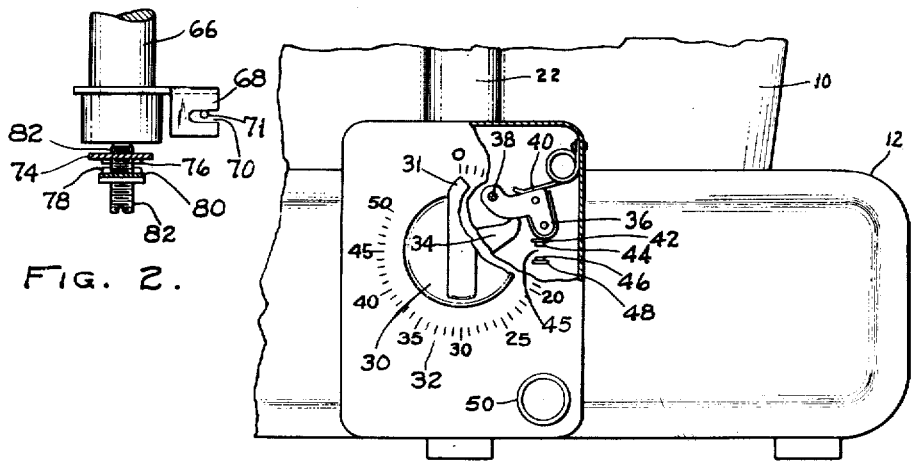
Fig. 2 is an enlarged section on line II—II of Fig. 1.
Fig. 3 is an enlarged fragmentary elevational view of the control panel with certain parts broken away to show details of construction.

The timing device may be in the nature of a conventional clock mechanism which is suitably supported in position, as for example by a bracket 29, and includes a setting knob 30, having an index or pointer 31 and movable with reference to a graduated dial 32. The knob 30 may be used only for setting or for both setting and winding the clock mechanism, depending on the type of clock mechanism employed. The initial movement of the knob 30 in one direction (clockwise direction as illustrated in Fig. 3) also actuates an arm 34 in the same direction. The arm 34 is adapted to be actuated in a reverse, or counterclockwise, direction by operation of the clock mechanism. In the path of the return movement of the arm 34 is disposed a lever 36, pivoted at 38 and normally biased downwardly by a spring 40. Disposed in the downward path of the lever 36 is a normally upwardly-biased spring arm 42. The spring arm 42 carries one terminal 44 of the main switch 45 and is adapted to be depressed by the lever 36 to bring the terminal 44 into contact with the other terminal 46 of the switch 45 to close the latter. The terminal 46 is carried by a fixed arm 48. The arms 42 and 48 may also be supported from the bracket 29. The closing of the switch 45 at the start of the cooking operation energizes the lamp 50 through the wires 52 and energizes the heating element 16 through the wires 54 and the normally closed cycling switch 56 which controls delivery of energy to the heating element 16 during the cooking operation. The cycling switch 56 will be hereinafter further referred to.

The pressure-responsive means includes an expansible wafer 60 secured to a bracket 62 which, in turn, is suitably secured to the bracket 29. The wafer 60 communicates with the interior of the vessel 10 by means of a pipe 64, the free end of which is adapted to enter the guide member 28 to unseat the ball valve 26 when the vessel 10 is placed on the stand 12, as shown in Fig. 1. The lower wall of the wafer 60 carries a stem 66 which has or carries an ear 68, shown more clearly in Fig. 2. The ear 68 has a slot 70 through which a brake arm 71 extends (Fig. 2). The brake arm 71 is pivoted at 72 and is so constructed and arranged as to remain in any position to which it may be moved. The brake 71 is adapted to engage an escapement balance wheel 73 forming part of the timing device. The slot 70 is considerably wider than the thickness or diameter of the brake 71 for a purpose which will be hereinafter described. Secured to the bracket 29 is an arm 74 carrying the fixed terminal 76 of the cycling switch 56, the other or movable terminal 78 of which is carried by a spring arm 80 carried by the bracket 29 and normally biased upwardly. The spring arm 80 also carries a pin 82, which is preferably adjustable, and which is disposed in the path of movement of the stem 66. The cycling switch 56 is normally closed to energize the heating element 16 except as hereinafter explained.

*Operation*

The vessel 10, containing the material to be cooked and having the cover 20 tightly clamped in position, is placed on the stand 12 in such manner as to cause the upper end of the conduit 64 to enter the guide member 28 and the lower end of the conduit 24. This unseats the ball valve 26 and establishes communication between the interior of the vessel 10 and the bellows 60.

Assuming that the material is to be cooked for one-half hour under a steam pressure of fifteen pounds per square inch, the knob 30 is turned until the index 31 thereof registers with the numeral 30 on the dial 32. This rotates the arm 34 in clockwise direction and moves it out of the path of the lever 36. The lever 36 is now moved downwardly by the spring 40 to close the main switch 45 through the terminals 44 and 46. The closing of the switch 45 energizes the lamp 50, and since the cycling switch 56 is always closed at the beginning of a cooking operation, the heating element 16 is also energized through the terminals 76 and 78. In this position of the parts, the brake 71 engages the balance wheel 73 and prevents the timing device from beginning to measure the time for which it was set.

When the pressure within the wafer 60 reaches the value to which the wafer is adjusted, as for example, fifteen pounds per square inch, the lower side of the wafer depresses the stem 66 and ear 68. The downward movement of the ear 68 causes the upper edge of the slot 70 to contact and move the brake 71 out of engagement with the balance wheel 73, thus releasing the timing device which now begins to measure the time for which it is set. As above set forth, the brake 71 is pivoted at 72, but is frictionally retained, in any well-known manner, so as to remain in any position to which it may have been moved until it is again moved in the same or an opposite direction by the ear 68. Simultaneously with the movement of the brake 71, or shortly thereafter, the stem 66 also depresses the pin 82, thus depressing the arm 80 and separating the terminals 76 and 78. This opens the cycling switch 56 and deenergizes the heating element 16.

When the pressure within the vessel 10 falls below the desired value of fifteen pounds per square inch, the wafer 60 is contracted, thus moving the stem 66 upwardly and out of contact with the pin 82. This allows the spring arm 80 to move the terminal 78 upwardly against the terminal 76 to close the cycling switch 56 and reenergize the heating element 16 and so on.

Due to the fact that the slot 70 is wider than the thickness or width of the brake 71, the stem 66 and the ear 68 can move upwardly sufficiently to allow the terminals 76 and 78 to close the cycling switch 56 without the lower edge of the slot 70 contacting or moving the brake 71 upwardly and causing it to re-engage the balance wheel 73. The size of the slot 70 is such that the pressure within the vessel 10 must fall well below the desired value before the wafer 60 contracts sufficiently to raise the stem 66 and ear 68 enough to move the brake 71 into engagement with the balance wheel 73. This occurs only after the cooking operation is completed and the vessel 10 has cooled off. Therefore, it is clear that, once the brake 71 is disengaged from the balance wheel 73 by the wafer 60, the brake 71 is not further affected by the closing and opening of the terminals 76 and 78 of the cycling switch 56 during the cooking operation. As will be seen from Fig. 4, the lamp 50 remains energized as long as the main switch 45 is closed, regardless of the opening and closing of the cycling switch 56.

When the cooking period for which the timing device was set has elapsed, the knob 30 will have returned to zero position and the arm 34 moves counterclockwise into engagement with and raises the lever 36, thus causing, or permitting, the terminals 44 and 46 to separate and open the main switch 45. This deenergizes both the heater 16 and the lamp 50. The deenergization of the lamp 50 informs the operator that the cooking cycle has been completed.

Figure 5:
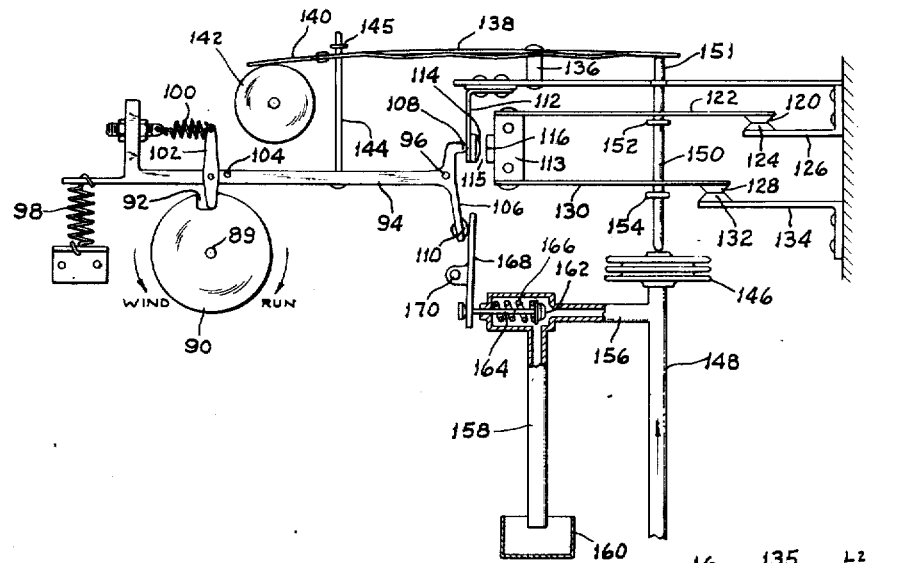
Fig. 5 is a diagrammatic view illustrating a modified form of control mechanism for the pressure cooker shown in Fig. 1, said mechanism being shown in the "off" position.
Figure 6:
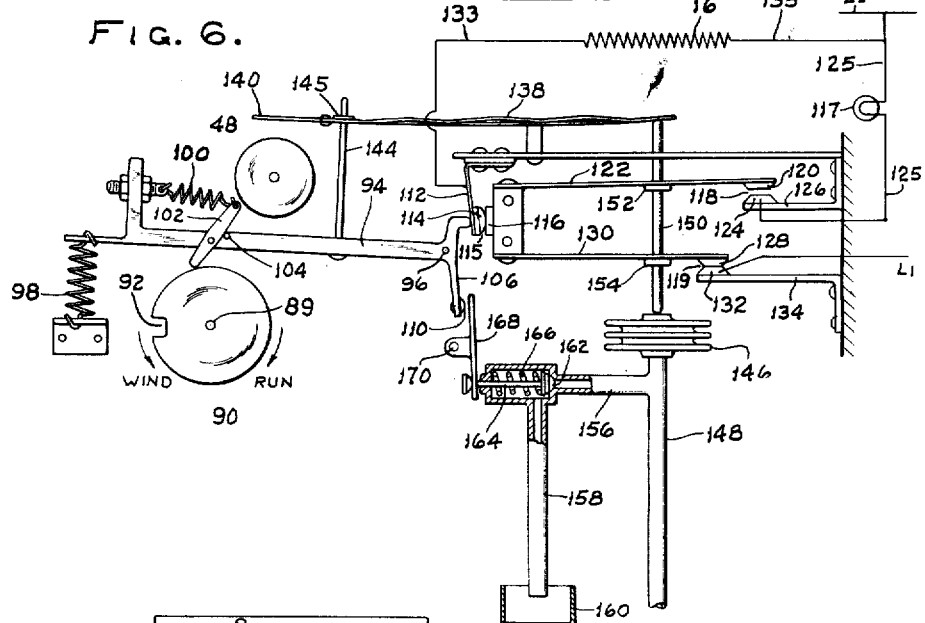
Fig. 6 is a view similar to Fig. 5, illustrating the control mechanism in the "on" position and also showing the electric circuit used; and, Fig. 7 is a diagrammatic view of another form of the control panel.
Figure 7:
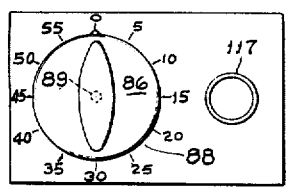

In Figs. 5 to 7, I show a modified form of control mechanism which is adapted to be used in connection with the same vessel 10 and stand 14 and which is only diagrammatically illustrated. This form of control includes a conventional clock mechanism adapted to be set, or wound and set, by a knob 86 which is movable with reference to a graduated dial 88. The knob 86 is carried by a shaft 89 which also carries and moves a disc 90 which has a peripheral notch 92. Cooperating with the clock mechanism is a trigger and resetting mechanism including a lever 94 fulcrumed at 96 and biased by a tension spring 98. Pivoted to the lever 94 and biased by a tension spring 100 is a lever 102, one end of which is adapted to seat in the notch 92 on the periphery of the disc 90 when the apparatus is in the "off" position as in Fig. 5, or to ride on the periphery of the disc 90 when the apparatus is in the "on" or operative position as in Fig. 6.

When the lever 102 is in the position shown in Fig. 6 it bears against a pin 104 on the lever 94 to move the latter about its fulcrum 96 in a manner and for a purpose hereinafter set forth. The lever 94 terminates in a cross piece 106 having a finger 108 at one end and a knob 110 at the other end thereof. Disposed in the path of the finger 108 is a suitably supported spring arm 112 carrying one terminal 114 of a main switch 115, the other terminal 116 of which is fixedly secured at 113. The spring arm 112 normally biases the terminal 114 away from the fixed terminal 116 to open the switch 115.

The main switch 115 controls a circuit which is supplied with current by leads $L_1$ and $L_2$ and to which the heating element 16 and a signal lamp 117, adapted to indicate the degree of pressure within the vessel 10, are connected in parallel. This circuit includes a normally-closed switch 118 which controls the energization of the lamp 117, and a normally-closed cycling switch 119 which regulates the energization of the heating element 16 during the cooking operation.

The switch 118 comprises a movable terminal 120 carried by a downwardly-biased spring arm 122 and a fixed terminal 124 carried by an arm 126. The terminal 124 is connected to the lamp 117 and to the lead $L_2$ by a wire 125, while the terminal 120 is electrically connected to the terminal 116 through the arm 122 or by any other suitable means.

The cycling switch 119 comprises a movable terminal 128 carried by a downwardly-biased spring arm 130 and a fixed terminal 132 carried by an arm 134. The terminal 132 is connected in any suitable manner to the lead $L_1$ and the terminal 128 is electrically connected through the arm 130, or any other suitable means, to the terminal 116. It is to be understood that other means for connecting the terminal 128 to the terminal 120 may be employed. The movable main terminal 114 is connected to the heating element 16 by a wire 133 and the heating element is connected to the lead $L_2$ by a wire 135.

It will thus be seen that with the switches 115, 118 and 119 all closed, the heating element 16 and the signal lamp 117 are both energized; that with the switch 115 open and the switches 118 and 119 closed, the signal lamp only is energized; that with the switch 119 open, the heating element 16 is deenergized, regardless of the position of the switches 115 and 118; and that, with either of the switches 118 or 119 open, the lamp 117 is deenergized, regardless of the position of the switch 115.

Carried by a fixed support 136 is a toggle 138 which actuates a brake 140 adapted to engage the balance wheel 142 of the clock mechanism. The toggle 138 is connected to the lever 94 by a resetting stem 144, the upper end of which engages or passes through an opening in the toggle 138 and is provided with a stop collar 145. A bellows 146 is connected to the interior of the vessel 10 by a pipe 148, the other end of which is adapted to pass through the guide member 28 to unseat the ball valve 26 and establish communication between the bellows 146 and vessel 10 in the manner described in connection with Fig. 1. Coacting with the bellows 146 is a rod 150 which is provided with a stop collar 152 adapted to engage the contact arm 122 and a collar 154 adapted to engage the contact arm 130.

A branch pipe 156 connects the pipe 148 with a steam exhaust pipe 158. The lower end of the pipe 158 is disposed in a receptacle 160 which serves as a baffle to prevent escape of live steam directly into the room and to retain any condensate. The branch pipe 156 is normally closed off from the exhaust pipe 158 by a valve 162, carried by a rod 164 and normally biased into closing position by a spring 166. The rod 164 is engaged and adapted to be actuated by one end of a lever 168 which is pivoted at 170, and the other end of which is adapted to be engaged and actuated by the knob 110 of the adjacent end of the cross piece 106.

*Operation*

When it is desired to use a pressure cooker provided with this type of control, the vessel 10 is placed on the stand 12 and an electric plug (not shown) is inserted into a convenient electric outlet. The lamp 117 is now energized through the lead $L_1$, the terminals of the normally-closed switch 119, the spring arms 130 and 122 which are electrically interconnected, the terminals 120 and 124 of the normally-closed switch 118, the wires 125 and the lead $L_2$. It will be seen that, as long as the terminals 114 and 116 of the main switch 115 are open, the heating element 16 remains unenergized. Assuming that it is desired to cook the material for a period of one-half hour under a pressure of fifteen pounds per square inch, it is merely necessary to turn the knob 86 until the point or index thereof registers with the numeral 30 on the dial 88. This causes the lever 102 to ride on the periphery of the disc 90 (see Fig. 6) and, in this position, the lever 102, pressing against the pin 104, tilts the lever 94 about the fulcrum 96 from the position shown in Fig. 5 to the position shown in Fig. 6. In this position, the finger 108 closes the switch 115 and energizes the heating element 16 through the lead $L_1$, the normally-closed switch 119, the spring arm 130, the terminals 116 and 114, the spring arm 112, the wires 133 and 135 and the lead $L_2$. It will be noted that as long as the main switch 115 and the auxiliary cycling switch 119 are closed, the heating element 16 remains energized regardless of the opening or closing of the switch 118. In this position of the parts, the brake 140 engages the balance wheel 142 of the clock mechanism and hence the disc 90 remains stationary while the vessel 10 is being heated. As steam pressure develops within the vessel 10, it is transmitted through the pipe 148 to the bellows 146 to expand the latter, and the parts are so constructed and adjusted that, when approximately ¼ pound per square inch of pressure is developed within the vessel 10, the collar 152 engages the arm 122 to open the switch 118. This deenergizes the lamp 117 to indicate the presence of a high or unsafe degree of pressure within the vessel 10, and thus warns the operator that it is not safe to open the vessel. Also, in this position of the parts, the knob 110 of the cross piece 106 is out of engagement with the adjacent end of the lever 168, thus leaving the spring 166 free to expand and urge the valve 162 to closed position to prevent steam passing from the pipe 148 into the exhaust pipe 158.

When the pressure within the vessel 10 has attained the desired predetermined value, such as fifteen pounds per square inch, the bellows 146 is expanded sufficiently to move the rod 150 further upwardly to bring the upper end 151 thereof into engagement with the adjacent end of the toggle 138. Under pressure of the rod 150, the toggle 138 snaps from the position shown in Fig. 5 to that shown in Fig. 6, in which the brake 140 is out of engagement with the balance wheel 142. The clock mechanism now starts to measure the period of time to which it was set and the disc 90 begins to turn in the direction of the arrow marked "Run."

Simultaneously with, or shortly after, the release of the brake 140, the collar 154 on the rod 150 moves the spring contact arm 130 upwardly to open the cycling switch 119, thus deenergizing the heating element 16 even though the main switch 115 is still closed. When the pressure within the vessel 10 drops to a point below the predetermined value, the bellows 146 contracts, the rod 150 and collar 154 move downwardly to permit the spring arm 130 to close the switch 119 and re-energize the heating element 16. In this way, the pressure within the pot 10 remains substantially constant. It will be noted that the opening and closing of the switch 119 does not in any way affect the switch 118 which remains open as long as the pressure within the vessel is over ¼ pound per square inch. Also, once the brake 140 has been released, the toggle 138 remains in its over-center position until it is positively reset in the manner hereinafter set forth.

When the time to which the clock mechanism was set has elapsed and the knob 86 has returned to the point on the dial 88 marked "Zero," the lever 102 again enters the notch 92 in the periphery of the disc 90. In this position, the lever 102 does not exert any pressure on the lever 94 and the spring 98 now withdraws the lever 94 from the position shown in Fig. 6 back to the position shown in Fig. 5, in which the finger 108 is moved away from the spring arm 112 carrying the movable contact 114. The spring arm 112 now biases the terminal 114 out of engagement with the terminal 116 to open the switch 115. The opening of the main switch 115 deenergizes the heating element 16 but does not in any way affect the circuit of the lamp 117. Simultaneously, the knob 110 actuates the lever 168 in clockwise direction to move the valve 162 to open position. Steam from the vessel 10 is now exhausted through the pipes 156 and 158. When the pressure within the vessel 10 has reached the predetermined low value of ¼ pound per square inch, the bellows 146 is sufficiently contracted to permit the rod 150 to drop until the collar 152 is retracted from contact with the spring arm 122. This permits the arm 122 to close the switch 118 and energize the lamp 117, thus indicating to the operator that it is now safe to open the vessel 10.

The movement of the lever 94 from the position shown in Fig. 6 to the position shown in Fig. 5 also actuates the stem 144 so as to cause the collar 145 at the upper end thereof to engage and move the toggle 138 downwardly at that point. The toggle 138 is thus reset and the brake 140 again engages the balance wheel 142. The control mechanism is now ready to begin another cycle.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A cooking device comprising a fluid-tight vessel for food to be cooked under pressure, means for heating said vessel, a time-measuring device adapted to be set for a predetermined period of cooking at a predetermined pressure, means operable upon said device being set for a period of cooking to render said heating means effective to deliver heat to said vessel, means operable in response to the pressure in said vessel for delaying the time-measuring operation of said device until said vessel reaches substantially said predetermined pressure and then for initiating such time-measuring operation, means for controlling the heat delivery of said heating means in response to the pressure in said vessel to maintain the same substantially constant, and means controlled by said time-measuring device to terminate heat delivery from said heating means upon the end of said predetermined period of time.

2. A pressure cooking device comprising a fluidtight vessel, heating means for heating said vessel, a clock mechanism including means to set the same to measure a predetermined time interval and to energize said heating means, a brake adapted to engage and render said clock mechanism ineffective to measure said time interval, pressure-responsive means adapted to disengage said brake from said clock mechanism to render the latter effective to begin measuring said time interval when the pressure within said vessel first reaches a predetermined value, means also adapted to be actuated by said pressure-responsive means and controlling said heating means to maintain the pressure within said vessel substantially at a predetermined value, and means operable by said clock mechanism to terminate energization of said heating means at the end of said time interval.

3. The structure recited in claim 2 together with a visual signal operable to indicate the end of the cooking operation.

4. The structure recited in claim 2 together with means operable to re-engage said brake with said clock mechanism automatically to adapt the cooking device for the beginning of another cooking operation.

5. The structure recited in claim 2 together with means for automatically discharging steam from said vessel at the end of the cooking operation.

6. The structure recited in claim 2 together with means for discharging steam from said vessel at the end of the cooking operation and means for indicating that the pressure within said vessel has reached the predetermined low value.

7. A pressure cooking device comprising a fluidtight vessel, heating means for heating said vessel, a clock mechanism including means to set the same to measure a predetermined time interval and to energize said heating means, a brake adapted to engage and render said clock mechanism ineffective to measure said time interval, temperature-responsive means adapted to disengage said brake from said clock mechanism to render the latter effective to begin measuring said time interval, when the temperature within said vessel first reaches a predetermined value, means also adapted to be actuated by said temperature-responsive means and controlling said heating means to maintain the temperature within said vessel substantially at a predetermined value, and means operable by said clock mechanism to terminate energization of said heating means at the end of said time interval.

HAROLD P. ALLEN.

Disclaimer 2,369,932.—*Harold P. Allen*, Mansfield, Ohio. PRESSURE COOKER. Patent dated Feb. 20, 1945. Disclaimer filed Dec. 13, 1947, by the assignee, *Westinghouse Electric Corporation*.

Hereby enters this disclaimer to claims 1 to 5 inclusive and claim 7 of said patent.

[*Official Gazette January 20, 1948.*]